(12) United States Patent
Shiraishi et al.

(10) Patent No.: US 7,654,247 B2
(45) Date of Patent: Feb. 2, 2010

(54) METHOD AND DEVICE FOR CONTROLLING STARTING OF GAS ENGINE

(75) Inventors: Masataka Shiraishi, Kanagawa-Ken (JP); Yoshitaka Kakuhama, Kanagawa-Ken (JP); Kei Sakai, Kanagawa-Ken (JP); Yosuke Kitamura, Kanagawa-Ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/230,439

(22) Filed: Aug. 28, 2008

(65) Prior Publication Data
US 2009/0071438 A1 Mar. 19, 2009

(30) Foreign Application Priority Data
Aug. 30, 2007 (JP) ............................. 2007-224665

(51) Int. Cl.
*F02D 9/08* (2006.01)
*F02D 41/14* (2006.01)

(52) U.S. Cl. ...................................... 123/403; 701/103
(58) Field of Classification Search ......... 701/102–105, 701/110, 113; 123/332, 403, 339.12; 180/65.1, 180/65.2, 65.4
See application file for complete search history.

(56) References Cited

U.S. PATENT DOCUMENTS

| | | | | |
|---|---|---|---|---|
| 4,453,514 A | * | 6/1984 | Martinsons et al. | 123/327 |
| 4,644,922 A | * | 2/1987 | Glockler et al. | 123/682 |
| 6,234,932 B1 | * | 5/2001 | Kuroda et al. | 477/3 |
| 6,950,741 B2 | * | 9/2005 | Ishikawa et al. | 701/110 |
| 7,201,127 B2 | * | 4/2007 | Rockwell et al. | 123/179.16 |
| 7,234,442 B2 | * | 6/2007 | Hanson et al. | 123/332 |
| 7,273,033 B2 | * | 9/2007 | Kinoshita | 123/339.11 |
| 7,353,105 B2 | * | 4/2008 | Mino et al. | 701/110 |
| 7,437,233 B2 | * | 10/2008 | Yasui et al. | 701/102 |

FOREIGN PATENT DOCUMENTS

| | | |
|---|---|---|
| JP | 5-141298 A | 6/1993 |
| JP | 6-264822 A | 9/1994 |
| JP | 2003-262139 A | 9/2003 |

* cited by examiner

*Primary Examiner*—Stephen K Cronin
*Assistant Examiner*—Johnny H Hoang
(74) *Attorney, Agent, or Firm*—Birch, Stewart, Kolasch & Birch, LLP

(57) ABSTRACT

A gas engine has a starting operation mode in which fuel gas flow is controlled based on actual mixture flow rate and adequate excess air ratio prescribed for each of detected values of operating conditions of the engine and then mixture flow is controlled so that engine rotation speed approaches a target rotation speed, and a normal operation mode in which fuel gas flow is controlled so that engine rotation speed approaches the target rotation speed and then mixture flow rate is controlled so that air fuel ratio of the mixture coincides with an adequate value prescribed for each of detected values of operating conditions of the gas engine with the fuel gas flow flowing at the commanded fuel gas flow rate, and a switchover rotation speed is predetermined so that operation mode is switched from starting mode to normal mode when engine speed reaches the switchover rotation speed.

9 Claims, 9 Drawing Sheets

FIG. 6 (Normal operation mode B)

FIG. 7

Fuel gas flow limit map

| | MAP [%] | | | | | |
|---|---|---|---|---|---|---|
| Rotation speed [min−1] | | 0 | 20 | 30 | 40 | 50 | ... |
| | 0 | 5 | 5 | 5 | 5.89 | 6.37 | |
| | 250 | 5 | 5 | 5 | 5.89 | 6.37 | |
| | 500 | 5 | 5.08 | 5.08 | 6.02 | 6.02 | |
| | 750 | 5.20 | 6.35 | 7.59 | 7.59 | 7.59 | |
| | 1000 | 5.62 | 6.98 | 8.13 | 8.13 | 8.13 | |
| | 1100 | 5.81 | 7.12 | 8.46 | 9.89 | 9.89 | |
| | 1200 | 6.15 | 7.85 | 9.24 | 10.04 | 10.04 | |
| | ... | | | | | | |

FIG. 8

Adequate excess air ratio limit map

| | MAP [%] | | | | | |
|---|---|---|---|---|---|---|
| Rotation speed [min−1] | | 0 | 10 | 20 | 30 | 40 | ... |
| | 0 | 0.800 | 0.800 | 0.800 | 0.800 | 0.800 | |
| | 300 | 1.100 | 1.100 | 1.100 | 1.100 | 1.000 | |
| | 500 | 1.120 | 1.120 | 1.120 | 1.120 | 1.120 | |
| | 750 | 1.350 | 1.350 | 1.350 | 1.250 | 1.350 | |
| | 1000 | 1.350 | 1.350 | 1.350 | 1.350 | 1.350 | |
| | 1100 | 1.420 | 1.420 | 8.46 | 9.89 | 1.420 | |
| | 1200 | 1.520 | 1.520 | 1.520 | 1.520 | 1.520 | |
| | ... | | | | | | |

FIG.9

Adequate excess air ratio map

| | MAP [%] | | | | | |
|---|---|---|---|---|---|---|
| | 0 | 10 | 20 | 30 | 40 | ... |
| Rotation speed [min−1] 0 | 0.800 | 0.800 | 0.800 | 0.800 | 0.800 | |
| 300 | 1.100 | 1.100 | 1.100 | 1.100 | 1.000 | |
| 500 | 1.120 | 1.120 | 1.120 | 1.120 | 1.120 | |
| 750 | 1.350 | 1.350 | 1.350 | 1.250 | 1.350 | |
| 1000 | 1.520 | 1.520 | 1.520 | 1.520 | 1.520 | |
| 1100 | 1.520 | 1.520 | 1.520 | 1.520 | 1.520 | |
| 1200 | 1.650 | 1.650 | 1.650 | 1.680 | 1.720 | |
| ... | | | | | | |

METHOD AND DEVICE FOR CONTROLLING STARTING OF GAS ENGINE

BACKGROUND OF THE INVENTION

1. Field of the Invention

The present invention will be applied to a gas engine in which fuel gas introduced via a fuel supply pipe is mixed with air introduced via a charging air supply pipe and this mixture is supplied via a fuel-air mixture supply pipe to a combustion chamber of the engine. The invention relates to a method and device for controlling starting of a gas engine equipped with a fuel gas flow control valve to its fuel gas supply pipe to control fuel gas flow, a throttle valve to its fuel-air mixture supply pipe to control fuel-air mixture flow, and an electronic control unit for performing integrative control of engine rotation speed and air fuel ratio by means of the valves, specifically those of a gas engine which is improved in load responsivity while maintaining air accurate fuel ratio control and superior in starting performance with decreased starting period.

2. Description of the Related Art

Gas engines are internal combustion engines which use as fuel gaseous fuel such as natural gas. They can output high driving power with high efficiency, and widely adopted as engines for driving generators in normal and emergency service, engines for construction equipment, engines for ships, and engines for railroad vehicles. Besides, gas engines are used not only to drive generators for supplying electric power, but waste heat thereof is utilized as heat source for heating water, so they are superior in efficiency in energy use.

In a gas engine, fuel gas is supplied via a mixer into air introduced through a charging air supply pipe, fuel-air mixture consisting of the air and the fuel gas is supplied into a combustion chamber of the engine through an fuel-air mixture supply pipe, and driving power is generated by combustion of the fuel-air mixture in the combustion chamber.

In FIG. 10 is shown a conventionally prevalent gas engine. Here is shown as an example a turbocharged gas engine 1 having a subsidiary chamber for ignition.

As shown in the drawing, charging air flows through an air supply pipe 10 to a gas mixer 12, fuel gas flows through a fuel gas pipe 13, 14 to the gas mixer 12 via a main-chamber regulator 15 where air pressure is regulated and then via a main chamber fuel flow control valve 16 where fuel flow is controlled. The charging air and fuel gas are mixed in the mixer 12 to produce lean fuel-air mixture. The lean mixture is compressed by a compressor 26 of a turbocharger 25, then introduced into a main combustion chamber 7 in the suction stroke through a fuel-air mixture supply pipe 20 to be burned there after compressed in compression stroke. The burnt gas flows out from the combustion chamber 7 and is introduced as exhaust gas through an exhaust pipe 28 to a turbine 27 of the turbocharger 25. The exhaust gas drives the turbine and is exhausted outside.

On the other hand, a part of the fuel gas (subsidiary chamber fuel gas) introduced through the fuel gas pipe 13 is introduced through a subsidiary fuel gas pipe 21 branching from the fuel gas pipe 13 to a subsidiary-chamber regulator 23 where the fuel gas is regulated in pressure, then the fuel gas is introduced into a subsidiary chamber 8 provided in a cylinder head 3 of the engine 1 to be ignited by a spark of an ignition plug located at an upper position of the subsidiary chamber 8 near the top dead center of the engine cycle. The flame produced by the ignition of the fuel gas in the subsidiary chamber jets out to the main combustion chamber 7 to ignite the fuel-air mixture in the main combustion chamber.

It is necessary in the gas engine like this to control air fuel ratio in accordance with characteristics of fuel gas such as calorific value thereof in order to maintain optimum combustion evading occurrence of knocking and misfire and to reduce emission of harmful matter.

Conventionally, fuel-air mixture is controlled by the fuel flow control valve 16 to be a prescribed air fuel ratio with which normal combustion and reasonable exhaust gas property are maintained, and the fuel-air mixture of the prescribed air fuel ratio is supplied through the fuel-air mixture supply pipe 20 to the main combustion chamber 7 of the gas engine 1.

On the other hand, control of engine rotation speed is needed in order to maintain constant rotation speed in spite of changes in load. Engine speed control has been performed through controlling the flow rate of the fuel-air mixture of prescribed air fuel ratio supplied to the main combustion chamber 7 by controlling the opening of a throttle valve 18.

Conventionally, a fuel-air mixture control method consisting of air fuel ratio control and engine speed control as mentioned above has been widely adopted.

There is known another air fuel ratio control method of gas engine as disclosed in document 1 (Japanese Laid-Open Patent Application No. 5-141298). According to the disclosure, an oxygen sensor is attached to the exhaust pipe of the gas engine, and whether the fuel-air mixture supplied to the gas engine is rich or lean mixture is detected based on oxygen concentration of the exhaust gas detected by the oxygen sensor, and the air fuel ratio of the fuel-air mixture is controlled based on the result of the detection.

A further air fuel ratio control method of gas engines is disclosed in document 2 (Japanese Laid-Open Patent Application NO. 2003-262139). According to the disclosure, air compressed by the compressor of the turbocharger is introduced through an air supply path to fuel injection devices each being provided for each of a plurality of cylinders, on the other hand, fuel gas is introduced through a fuel supply path to the fuel injection devices, and fuel-air mixture mixed in each fuel injection device is supplied to each cylinder. With this control method, necessary air flow is calculated based on detected fuel flow in the fuel supply path, actual air flow is calculated based on detected air pressure and temperature in the air supply path, and air flow in the air supply path is controlled so that actual air flow coincides with calculated air flow.

On the other hand, there has been a problem in the control of gas engines that ignition of fuel-air mixture because of low calorific value of fuel gas. In document 3 ((Japanese Laid-Open Patent Application No. 6-264822) is disclosed a device for controlling air fuel ratio when starting a gas engine to ease starting of the engine. According to the disclosure, a charging air flow control valve is provided at an air cleaner attached to an inlet air passage, and the flow control valve is controlled to reduce opening thereof in order to reduce air fuel ratio to a prescribed value by reducing charging air flow when starting the engine and the valve is fully opened after the engine has started. In this way, mixture becomes easy to ignite and starting performance of the engine will be improved.

However, there has been a disadvantage that response to change of load is slow with the conventional fuel-air mixture control method as mentioned above, although it has an advantage of easiness of controlling air fuel ratio. Particularly, response when load is applied or shut off is slow, and improvement in response to load change has been demanded in order to attain high performance of gas engines. There is as one of problems of responsivity a disadvantage that, even if fine control is carried out to stabilize engine speed, stabilization of engine speed is difficult because of slow responsivity.

As a method of controlling engine speed with rapid response, there is known a method of controlling fuel gas flow to accommodate changes of load. However, with this conventional method, control of air fuel ratio is difficult, and stable combustion control cannot be achieved. As it is difficult to keep air fuel ratio in an appropriate range, there occurs a problem of compliance with exhaust emission regulation. Moreover, as fuel flow can not be detected quantitatively with the conventionally prevalent fuel gas flow control method of controlling the opening of the fuel flow control valve, over run or overload of engine due to excessive supply of fuel is apt to occur. Particularly, engine stall or abnormal combustion is apt to occur at application or rejection of load because of difficulty of accurate control of air fuel ratio when applying or shutting off load.

Furthermore, in the conventional fuel-air mixture control method, it is required to have leeway in supercharging pressure in order to secure ample engine output, and decrease in thermal efficiency is unavoidable due to pumping loss caused by throttling the mixture inlet passage to the main combustion chamber. On the other hand, with the fuel gas flow control method, the engine is immune from the problem of output shortage due to increased pumping loss, however, it is difficult to keep air fuel ratio in an appropriate range and comply with exhaust emission regulation.

With air fuel ratio control using a signal from the oxygen sensor as a feedback signal as recited in the document 1, manufacturing cost will be increased due to expensive oxygen sensor.

On the other hand, the gas engine recited in the document 2 is provided with fuel injection devices and fuel flow control valves for each of a plurality of cylinders respectively, and different from the gas engine of this patent application in basic configuration. The configuration of the gas engine of the document 1 is suited for a large engine and difficult to adopt for a small engine. Besides, as a part of air supplied from the compressor is released to outside through the air release valve to control air quantity charged into the combustion chamber, efficiency of the engine is reduced, and a larger compressor is required.

With the air fuel ratio control method disclosed in the document 3, starting performance is improved by reducing excess air ratio of the mixture, however, there occurs a problem that responsivity as mentioned above is slow when load is applied after the engine has started.

With the fuel gas flow control method, controlling at engine starting is performed by controlling opening of the fuel gas flow control valve and the throttle valve, so the engine starting is apt to be unstable.

Furthermore, with the conventional control device, air fuel ratio control and engine speed control are performed by separate control devices respectively, however, there is a disadvantage that manufacturing cost increases since the control devices are expensive, and in addition, to assure coordinated behavior of each device is difficult, which makes smooth control of the engine difficult.

SUMMARY OF THE INVENTION

The present invention was made in light of problems of prior arts, and the object of the invention is to provide a method and device for controlling starting of a gas engine with which smooth and sophisticated control of engine operation is made possible by uniting air fuel ratio control and speed control so that coordinated control of the engine is performed under cooperation of the speed control and air fuel ratio control, and further load responsivity is improved while maintaining accurate air fuel ratio control, and furthermore engine starting performance is superior with starting period decreased.

To attain the object, the present invention proposes a method of controlling starting of a gas engine in which fuel gas is introduced via a fuel gas flow control valve to a charging air supply pipe to be mixed with the air and the mixture is controlled in its flow rate by a throttle valve and supplied to combustion chambers of the engine, wherein are provided a starting operation mode in which fuel gas flow is controlled by the fuel gas flow control valve based on actual mixture flow rate and adequate excess air ratio prescribed for each of detected values of operating conditions of the engine and then mixture flow is controlled by the throttle valve so that engine rotation speed approaches a target rotation speed, and a normal operation mode in which fuel gas flow is controlled by the fuel gas flow control valve so that engine rotation speed approaches the target rotation speed and then mixture flow rate is controlled by the throttle valve so that air fuel ratio of the mixture coincides with an adequate value prescribed for each of detected values of operating conditions of the gas engine with the fuel gas flow flowing at the commanded fuel gas flow rate, wherein a switchover rotation speed is predetermined which is a threshold value of engine rotation speed for the engine to be able to run self-reliably, and wherein the engine is controlled in the starting operation mode during engine rotation speed of from a prescribed initial rotation speed to a prescribed switchover rotation speed, and when the rotation speed rises to equal to or exceeds the prescribed switchover rotation speed, the control is switched to the normal operation mode.

According to the invention, switching between the starting operation mode and normal operation mode is possible, so optimum control is possible in accordance with engine operation condition.

More specifically, in the normal operation mode, improvement in responsivity to load change and stability in engine control can be achieved and particularly load responsivity when applying load or rejecting load can be improved by accurate air fuel ratio control. On the other hand, in the starting operation mode, optimum command value of fuel gas flow rate is calculated based on actual mixture flow and adequate value of excess air ratio and fuel gas flow is controlled by the fuel gas flow control valve based on the command value of fuel gas flow rate, so mixture of adequate air fuel ratio can be supplied to the combustion chamber when starting the engine, which results in improved ignition of the mixture and improved starting performance.

In the method of the invention, the normal operation mode comprises a speed control process for controlling engine rotation speed by calculating a command value of fuel gas flow rate based on deviation of a detected engine rotation speed from a target command value of engine rotation speed and controlling fuel gas flow rate flowing through the fuel gas flow control valve to coincide with the calculated command value of fuel gas flow rate, and an air fuel ratio control process for controlling air fuel ratio of fuel-air mixture supplied to the combustion chamber of the engine through performing feedback control in which such a command value of fuel-air mixture flow rate is calculated that air fuel ratio of the mixture coincides with an adequate value prescribed for each of detected values of operating conditions of the gas engine with the fuel gas flow flowing at the commanded fuel gas flow rate and a target opening of the throttle valve is determined based on deviation of the actual mixture flow rate calculated based on detected values of operating conditions of the gas engine from the calculated command value of fuel-air mixture flow rate.

Although, in the normal operation mode in the invention, the throttle valve is used for mixture flow control, air fuel ratio can be controlled based on detected values of pressure and temperature of the engine, so pumping loss, i.e. throttle loss can be reduced to a minimum by balancing advantages of mixture flow control and fuel gas flow control. Furthermore, as air fuel ratio control can be achieved with accuracy by controlling the fuel gas flow control valve and mixture control valve (throttle valve), an expensive exhaust gas sensor (oxygen sensor) is not needed and the device can be manufactures at a moderate cost.

Further, in the method, capacity correction is performed when calculating mixture flow rate as actual mixture flow rate at the initial stage of starting operation, the capacity correction being such that content volume of an intake manifold of the engine is added to the total piston swept volume of the engine.

When starting a gas engine, fuel gas is not present in the main fuel gas supply pipe and in the mixture supply pipe (inlet manifold) between the fuel gas flow control valve and combustion chamber, so some time is needed for fuel gas to reach the combustion chamber at the initial stage of starting operation. According to the invention, time needed for starting the engine can be reduced by performing capacity correction processing, since fuel gas flow is increased by an amount for the content volume of the inlet manifold by this correction.

Furthermore, in the method, the capacity correction processing is finished when a prescribed time period of correction continuation has elapsed or engine rotation speed has reached a prescribed rotation speed.

By this, the capacity correction is applied for a required time period in starting operation and accurate operation control can be performed.

The invention proposes a starting control device for controlling starting of a gas engine in which fuel gas is introduced via a fuel gas flow control valve to a charging air supply pipe to be mixed with the air and the mixture is controlled in its flow rate by a throttle valve and supplied to combustion chambers of the engine, the engine being equipped with a rotation speed sensor for detecting engine rotation speed, an inlet pressure sensor for detecting mixture inlet pressure, an inlet temperature sensor for detecting mixture inlet temperature, and an engine control device for controlling engine operation in accordance with detected values of operating conditions of the engine, wherein the engine control device has means that allows the fuel gas flow control valve to control fuel gas flow rate based on actual mixture flow rate detected engine rotation speed, inlet manifold pressure, and inlet manifold temperature and based on an adequate value of excess air ratio prescribed for each of detected values of operating conditions of the gas engine and a means to allow the throttle valve to control mixture flow rate so that engine rotation speed approaches a prescribed target rotation speed, thereby enabling the control device to perform engine operation in a starting operation mode, and means that allows the fuel gas flow control valve to control fuel gas flow rate so that engine rotation speed approaches a prescribed target rotation speed and means that allows the throttle valve to control mixture flow rate so that excess air ratio of the mixture coincides with an adequate value prescribed for each of detected values of operating conditions of the gas engine with the fuel gas flow flowing at the controlled fuel gas flow rate, thereby enabling the control device to perform engine operation in a normal operation mode, wherein a switching means for switching over operation mode from one mode to the other mode is provided, and wherein switchover rotation speed is predetermined which is a threshold value of engine rotation speed at which the engine can run self-reliantly, whereby the engine is controlled in the starting operation mode during engine rotation speed of from a prescribed initial rotation speed to a prescribed switchover rotation speed, and when the rotation speed rises to equal to or exceeds the prescribed switch rotation speed, the control is switched to the normal operation mode.

The engine control device of the invention comprises a speed control section for controlling engine rotation speed by calculating a command value of fuel gas flow rate based on deviation of a detected engine rotation speed from a target command value of engine rotation speed and controlling fuel gas flow rate flowing through the fuel gas flow control valve to coincide with the calculated command value of fuel gas flow rate, and an air fuel ratio control section for controlling air fuel ratio of fuel-air mixture supplied to the combustion chamber of the engine through performing feedback control in which such a command value of fuel-air mixture flow rate is calculated that air fuel ratio of the mixture coincides with an adequate value prescribed for each of detected values of operating conditions of the gas engine with the fuel gas flow flowing at the commanded fuel gas flow rate and a target opening of the throttle valve is determined based on deviation of the actual mixture flow rate calculated based on detected values of operating conditions of the gas engine from the calculated command value of fuel-air mixture flow rate.

Further, in the invention, capacity correction means is provided which performs such a capacity correction that content volume of an intake manifold of the engine is added to the total piston swept volume of the engine when calculating mixture flow rate as actual mixture flow rate at the initial stage of starting operation, whereby the capacity correction processing is finished when a prescribed time period of correction continuation has elapsed or engine rotation speed has reached a prescribed rotation speed.

As has been described in the foregoing, optimum control of engine is made possible by enabling switching operation mode between the starting operation mode and normal operation mode.

More specifically, improvement in responsivity to load change and stability in engine control can be achieved and particularly load responsivity when applying load or rejecting load can be improved by accurate air fuel ratio control in the normal operation mode. On the other hand, in the starting operation mode, optimum command value of fuel gas flow rate is calculated based on actual mixture flow and adequate value of excess air ratio and fuel gas flow is controlled by the fuel gas flow control valve based on the command value of fuel gas flow rate, so mixture of adequate air fuel ratio can be supplied to the combustion chamber when starting the engine, which results in improved ignition of the mixture and improved starting performance.

Moreover, time period needed for starting the engine can be reduced by performing the capacity correction of adding content volume of the intake manifold to the total piston swept volume when calculating mixture flow rate as actual mixture flow rate at the initial stage of starting operation.

Furthermore, by uniting air fuel ratio control and speed control so that coordinated control of the engine is performed under cooperation of the speed control and air fuel ratio control, smooth and sophisticated control of engine operation is made possible, an expensive exhaust gas sensor is not needed to provide, and significant cost reduction is made possible.

BRIEF DESCRIPTION OF THE DRAWINGS

FIG. 7 is a table showing an example of limit fuel gas flow map.

FIG. 8 is a table showing an example of limit excess air ratio map.

FIG. 9 is a table showing an example of adequate excess air ratio map.

DETAILED DESCRIPTION OF THE INVENTION

An embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

[Configuration of the Device]

Figure 1:
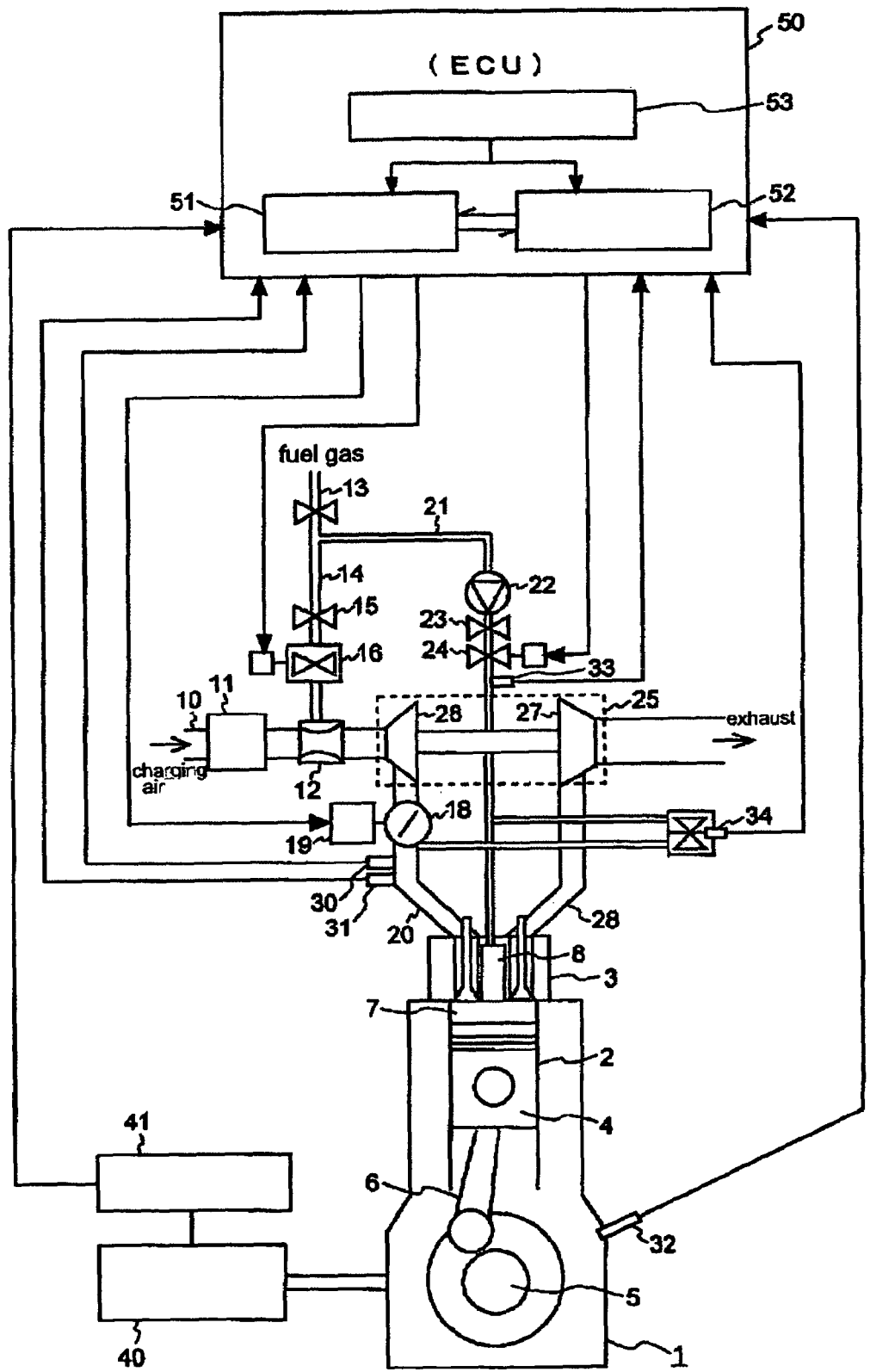
FIG. 1 is an overall configuration of an embodiment of the control device according to the invention including the gas engine.

Overall configuration of the gas engine equipped with an embodiment of the control device according to the invention will be explained with reference to FIG. 1. In FIG. 1 is shown as an example a turbocharged, lean burn gas engine with subsidiary ignition chamber for driving a generator, however, application of the control device of this embodiment is not limited to the gas engine of FIG. 1, the device is applicable to gas engines other than lean combustion type. Machines driven by the engine are of course not limited to generators.

As shown in the drawing, a gas engine which drives a generator 40 has a mixture supply pipe 20 for supplying a mixture of air and fuel gas to a main combustion chamber 7, and an exhaust pipe 28 for exhausting burnt gas form the main combustion chamber 7. The mixture supply pipe 20 and exhaust pipe 28 are connected to a compressor 26 and a turbine 27 respectively.

The gas engine 1 has a cylinder 2 and a cylinder head 3 mounted on the cylinder, a piston 4 is connected to a crankshaft 5 via a connecting rod 6, and the piston 4 moves up and down in the cylinder 2 as the crankshaft 5 rotates. The main combustion chamber (mainchamber) 7 is formed in the cylinder 2 above the piston 4, and a subsidiary chamber 8 connected to the main chamber 7 through a jet hole of the subsidiary chamber 8 is formed in the cylinder head 3.

An air cleaner 11 for filtering removing dust and foreign matter in air and a mixer 12 for mixing air and fuel gas are connected to a charging air supply pipe 10 for supplying charging air to the engine 1. A fuel supply pipe 13 for supplying fuel gas to the engine 1 is branched into a main chamber fuel supply pipe 14 and a subsidiary chamber fuel supply pipe 21. To the main chamber fuel supply pipe 14 are connected a pressure regulator 15 for regulating pressure of fuel gas to be supplied to the main chamber 7 to a prescribed pressure and a main chamber fuel flow control valve (fuel flow metering valve) 16 for controlling fuel gas flow supplied to the main chamber 7. The main chamber fuel flow control valve 16 is a variable opening valve for controlling fluid flow by electronic control and its structure is well known. To the subsidiary chamber fuel supply pipe 21 are connected a compressor 22 for pressurizing fuel gas supplied to the subsidiary chamber 8, a subsidiary chamber pressure regulator 23 for regulating pressure of the fuel gas to a subscribed pressure, and a pressure difference control valve 24 for controlling pressure difference between the pressure of the fuel gas supplied to the subsidiary chamber 8 and that of the mixture in the mixture supply pipe 20.

The turbocharger 25 comprises the turbine 27 driven by exhaust gas introduced through the exhaust pipe 28, and the compressor 26 connected with a shaft to the turbine 27, which is well known construction.

The gas mixer 12 is connected to the suction port of the compressor 26, and the discharge port of the compressor is connected to the mixture supply pipe 20 for supplying air pressurized by the compressor 26 to the main chamber 7 via inlet ports of the cylinder head 3.

A throttle valve 18 for controlling fuel-air mixture flow supplied to the main chamber 7 is attached to the mixture supply pipe 20. The throttle valve 18 is connected to a governor 19 and mixture flow rate is controlled by controlling the opening of the throttle valve 18. The mixture supply pipe 20 and exhaust pipe 28 respectively has a plurality of branch pipes to be communicated to a plurality of combustion chambers 7 of the multi-cylinder engine 1, although in the drawing is depicted as one pipe respectively for simplification's sake.

In the gas engine 1 composed as described above, charging air sucked through the air supply pipe 10 is introduced to a gas mixer 12, fuel gas is introduced through the fuel gas pipe 13 and main chamber fuel supply pipe 14 to the pressure regulator 15 to be regulated in pressure, then to the fuel gas flow control valve 16 to be controlled in flow rate, and then to the gas mixer 12. The charging air and fuel gas are mixed in the mixer 12 to produce lean fuel-air mixture. The lean mixture is compressed by a compressor 26 of a turbocharger 25, then flows through the throttle valve 18 where flow rate of the mixture is controlled, and then flows through the mixture supply pipe 20 into the main chamber 7 in the suction stroke to be burned there after compressed in compression stroke. On the other hand, a part of the fuel gas is introduced from the fuel gas pipe 13 through the subsidiary fuel gas pipe 21 to the pressure regulator 23 where the fuel gas is regulated in pressure, then the fuel gas is introduced into a subsidiary chamber 8. Pressure of the fuel gas to be supplied to the subsidiary chamber 8 is regulated by the pressure regulator 23 to an appropriate pressure in accordance with engine load based on pressure difference between the pressure of the fuel gas supplied to the subsidiary chamber 8 and that of the mixture in the mixture supply pipe 20 detected by the pressure difference control valve 24. Fuel gas introduced into the subsidiary chamber 8 is ignited by a spark of an iguition plug near the top dead center of the engine cycle. The flame produced by the ignition of the fuel gas in the subsidiary chamber fuel gas jets out to the main chamber 7 to ignite the fuel-air mixture in the main chamber 7, and the mixture is burned in the expansion stroke. The burnt gas is exhausted through exhaust ports in the cylinder head 3 and through the exhaust pipe 28 in the exhaust stroke to be introduced to the turbine 27 of the turbocharger 25.

The gas engine 1 is equipped with a plurality of sensors for detecting engine operating conditions. A MAP sensor 30 for detecting inlet mixture pressure and a MAT sensor 31 for detecting inlet mixture temperature are attached to the mixture supply pipe 20. Also, a rotation speed sensor 32 for detecting rotation speed of the engine, a subsidiary chamber fuel gas pressure sensor 33 for detecting pressure of the fuel gas supplied to the subsidiary chamber 8, a pressure difference sensor 34 for detecting pressure difference between the pressure of the fuel gas supplied to the subsidiary chamber 8 and that of the mixture in the mixture supply pipe 20, and a torque sensor (not shown in the drawing) for detecting engine output torque.

The generator 40 driven by the gas engine 1 is provided with a control panel 41 for overall controlling of the generator including control of shutoff switch attached to the generator 40.

Operation of the gas engine 1 is controlled by an electronic control unit (ECU) 50. The electronic engine control unit 50 is composed as a computer having a CPU, RAM, ROM, etc., and a speed control section 51 having a function of controlling engine rotation speed, and an air fuel ratio control section 52 having a function of controlling air fuel ratio are composed by these devices in the control unit. The speed control section 51 and air fuel ratio control section 52 perform coordinated control with each other. Further, an operation mode switching section 53 is provided in the control unit 50. Control operation of the speed control section 51 and the air fuel ratio control section 52 is switched over by the operation mode switching section 53 to set an operation mode in accordance with engine operation condition.

To the electronic control unit 50 are inputted detected signals from the MAP sensor 30, the MAT sensor 31, the speed sensor 32, etc. and a shutoff signal from the generator control panel 41. The control unit 50 performs a variety of arithmetic processing based on the input signals and sends calculation results as output signals to each of the valves. As output signals can be cited a fuel gas flow command signal, throttle opening control signal, pressure difference control valve opening control signal, etc.

In a case of a gas engine 1 with the subsidiary chamber 8, a pressure difference control section (not shown in the drawing) is provided in the electronic control unit 50, which controls pressure difference between the pressure of the fuel gas supplied to the subsidiary chamber 8 and that of the mixture in the mixture supply pipe 20 by receiving inlet mixture pressure from the MAP sensor 30, fuel gas pressure from the subsidiary chamber fuel gas pressure sensor 33, and pressure difference from the pressure difference sensor 34. The pressure difference control section is provided with calculation means for calculating one of pressures or pressure difference among the inlet mixture pressure, the fuel gas pressure, and the pressure difference from two of the pressures or pressure difference using a relation between them, viz. (fuel gas pressure supplied to the subsidiary chamber)=(pressure difference between the pressure of the fuel gas supplied to the subsidiary chamber 8 and that of the mixture in the mixture supply pipe 20)−(inlet mixture pressure). In this wise, even if any one of the sensors malfunctions, necessary pressures and pressure difference can be calculated from two pressure signals from normally functioning sensors. Therefore, provision of a plurality of sensors of the same kind to care for a case of occurrence on malfunction of the sensors becomes unnecessary.

[Starting Control]

The electronic control unit 50 can serve to control in starting operation mode A and in normal operation mode B by switching over control operation of the speed control section 51 and the air fuel ratio control section 52 accordingly. The switching over is performed by the operation mode switching section 53.

In the starting operation mode A, an optimum command value of fuel gas flow is calculated in the air fuel ratio control section 52 based on actual mixture flow rate and adequate excess air ratio calculated based on detected engine speed and calculated load factor, the fuel gas flow is controlled in accordance with the command value of fuel gas flow rate by the fuel gas flow rate control valve 16 to control air fuel ratio, and on the other hand in the speed control section 51 is controlled the opening of the throttle valve 18 based on detected engine rotation speed to control mixture flow rate thereby performing engine speed control.

In the normal operation mode B, command value of fuel gas flow is calculated in the speed control section 51 based on deviation of an engine rotation speed detected by the speed sensor 32 from a command value of engine speed which is a target value, speed control is performed through controlling the fuel gas flow by the fuel gas flow control valve 16, and on the other hand, in the air fuel control section 52, a command value of mixture flow is calculated of which its excess air ratio becomes an adequate excess air ratio prescribed depending on engine operation conditions when mixed with the command fuel gas flow, and engine speed is control by performing feedback control of controlling the opening of the throttle valve 18 based on deviation of the actual mixture flow rate calculated from detected values of operating conditions of the gas engine 1 from the command value of mixture flow rate.

Figure 2:
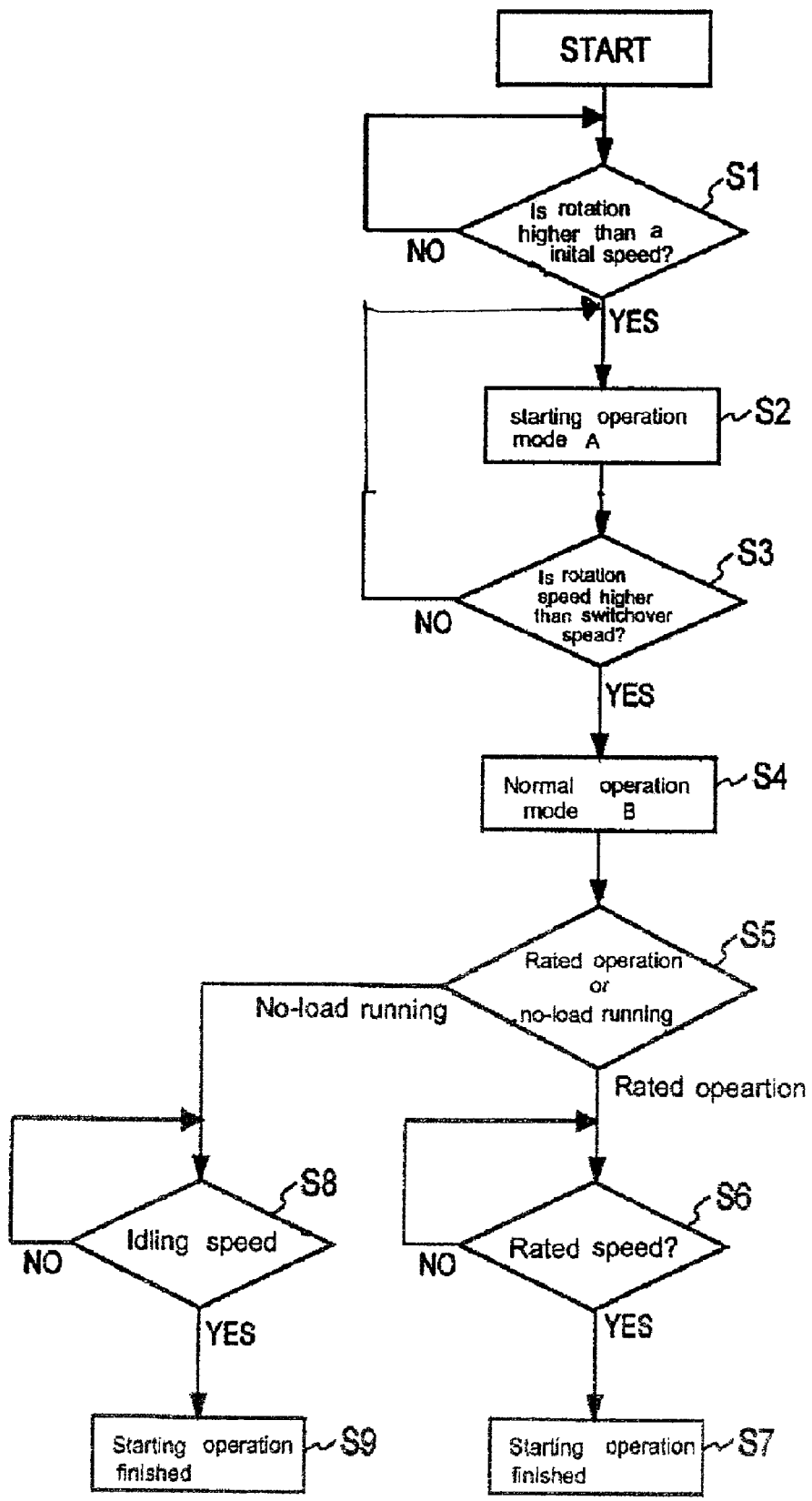
FIG. 2 is a flowchart of engine starting control.

In FIG. 2 is shown a flowchart of engine starting control. Referring to the flowchart, when the gas engine 1 is cranked and engine rotation speed rises to or exceeds the prescribed initial rotation speed (at step S1), it is judged that engine starting has begun normally and the electronic control unit is set to the starting operation mode A (at step S2). The prescribed initial rotation speed is set to for example 85 min$^{-1}$. Operations for starting the engine such as energizing the ignition plug are performed during the operation in the starting operation mode A.

Engine speed rises during operation in the starting operation mode A and whether engine speed exceeds a prescribed switchover rotation speed or not is judged (at step S3). The prescribed switchover rotation speed is a threshold value of engine rotation speed at which the engine can run self-reliantly, for example, it is set at 500 min$^{-1}$. When the rotation speed is equal to or exceeds the prescribed switchover rotation speed, it is a state that mixture is smoothly ignited in the combustion chamber, starter motor is switched off, and the self-reliant operation of the engine is secured. When engine rotation speed is lower than the prescribed switchover rotation speed, the starting operation mode A of step S2 is continued.

When the rotation speed rises equal to or exceeds the described switchover rotation speed, operation mode is changed by the operation mode switching section 53 from the starting operation mode A to the normal operation mode B (at step S4). Then whether required operation condition is rated operation or no-load running is judged (at step S5), and when rated operation is required and engine speed reaches the rated speed (at step S6) the starting control is finished (at step S7).

On the other hand, when no-load operation is required, and when engine rotation speed reaches the idling speed (at step S8), starting control is finished (at step 9). It is preferable to continue normal operation mode after the starting control is finished.

[Normal Operation Mode]

Figure 6:
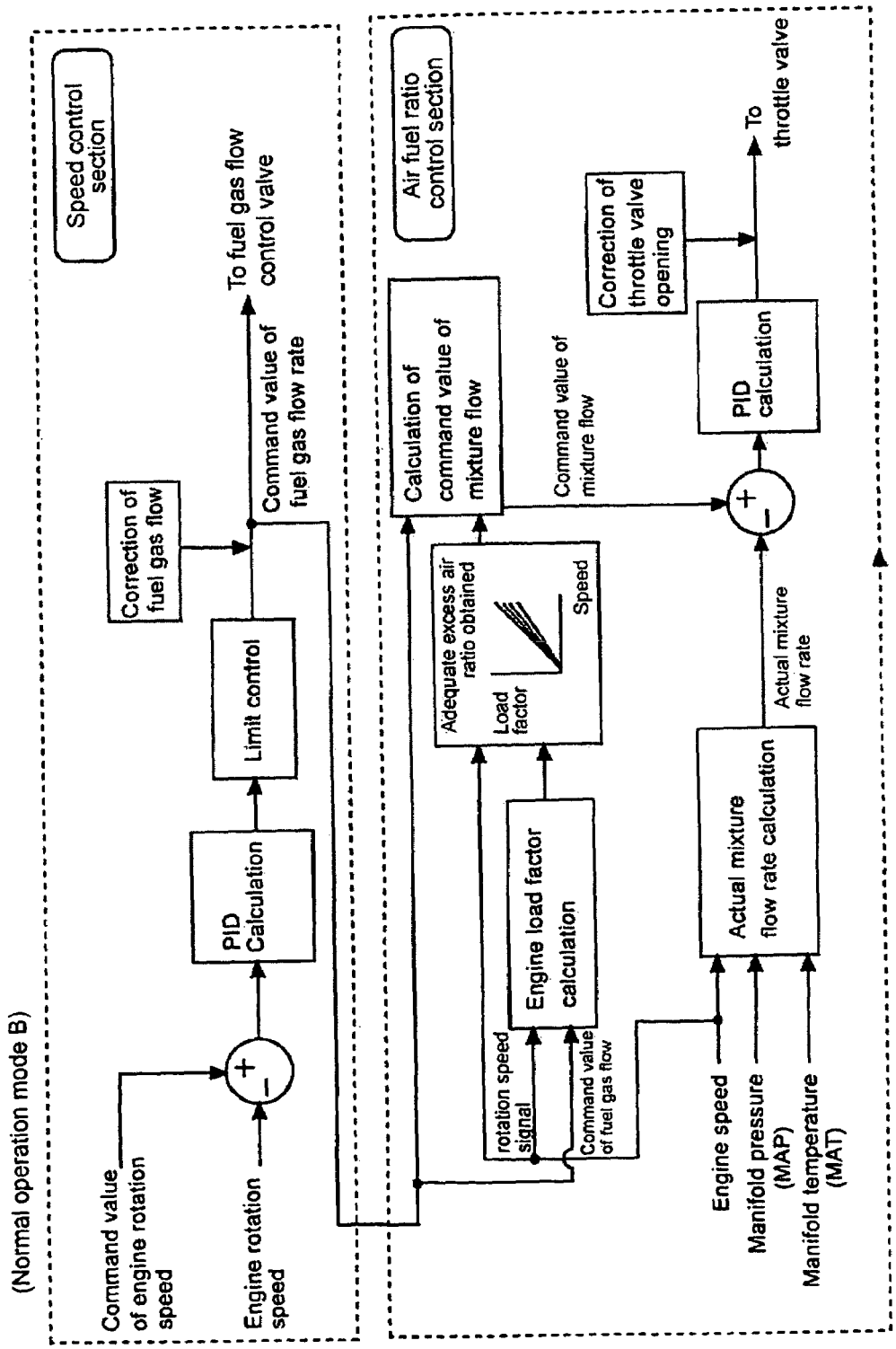
FIG. 6 is a control block diagram of operation mode B which is a normal operation mode.
Figure 10:
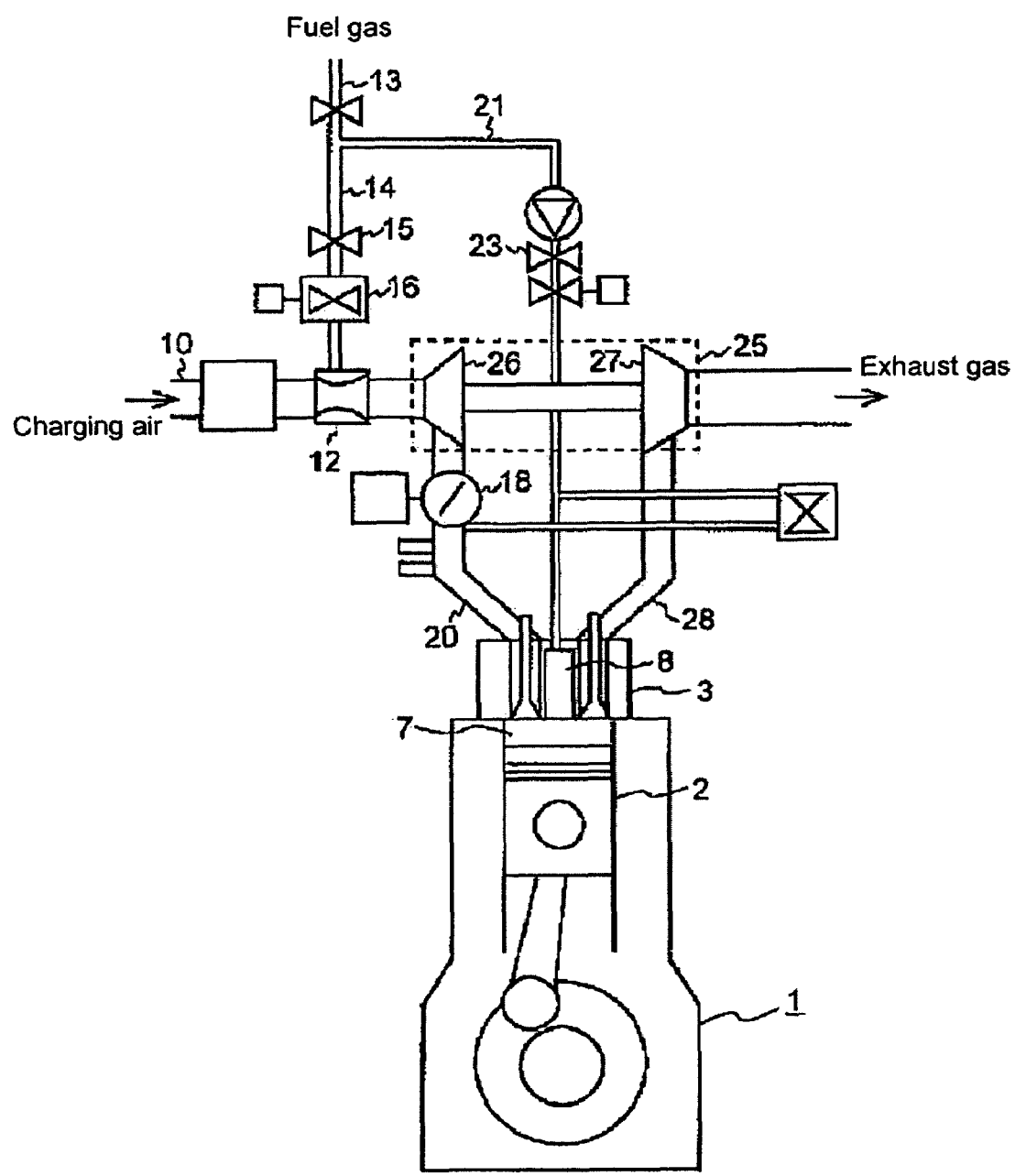
FIG. 10 is an overall configuration of a conventional gas engine.

Control flow of normal operation mode B will be explained concretely referring to FIG. 6.

First, fuel gas flow control in the speed control section 51 will be explained. Command value of fuel gas flow rate is calculated by PID calculation based on deviation of actual engine speed detected by the engine speed sensor 32 from a command value of engine speed, which is targeted speed for rated operation. The command value of engine speed will be changed according to operation condition such as rated speed operation, increasing speed operation, and decreasing speed operation.

Engine speed at no-load running, rated operation, limit speed at increasing operation, decreasing operation is changeable.

Then, limit control is performed to the calculated command value of fuel gas flow rate. In the limit control, a limit range of fuel gas flow including at least an upper limit is set beforehand. When the command value of fuel gas flow rate calculated by the PDI calculation exceeds the upper limit, the command value is corrected so that it in the limit range. The limit range may be set to include an upper limit and a lower limit.

The limit range is set based on specific conditions having physical meaning, for example, following conditions can be thought of as conditions for determining the limit range.

As a specific example, a method of setting limit ranges in normal operation of the engine based on permissible endurance or ruggedness of the gas engine can be cited. Limit ranges are set as shown in a fuel gas flow limit map of FIG. 7 for example. In the fuel gas flow limit map are used as parameters engine rotation speed and MAP (%) (ratio of manifold pressure to that when the engine is operated at full load) as a substitute of engine load and upper limit values of fuel gas flow are determined beforehand for engine rotation speed and MAP (%). An upper limit of fuel gas flow is obtained from the map based on inputted engine speed and MAP (%) signals, and the upper limit of fuel gas flow thus obtained is set as an upper limit for the command value of fuel gas flow calculated by the PID calculation.

According to the method, the gas engine can be operated within the permissible range of its endurance, so occurrence of trouble or abnormal deterioration of the engine can be prevented.

As another specific example, a method of setting limit ranges for air fuel ratio in transient operation of the gas engine 1 can be cited. The limit range of air fuel ratio is preferably set so that excess air ratio is in a range of 0.5~2.2. This range of excess air ratio corresponds to air fuel ratio with which normal combustion is attained.

In this method, excess air ratio of fuel-air mixture with which combustion in the combustion chamber of the gas engine is possible is taken as necessary condition, and limit ranges are set in an excess fuel ratio map as shown in FIG. 8 for example. In the excess air are used as parameters engine rotation speed and MAP (%)(ratio of manifold pressure to that when the engine is operated at full load) as a substitute of engine load and lower limit values of excess air ratio are determined beforehand for engine rotation speed and MAP (%). A lower limit of excess air ratio is obtained from the map based on inputted engine speed and MAP (%) signals, a fuel gas flow rate to correspond with the lower limit value of excess air ratio is calculated, and the fuel gas flow rate thus calculated is set as an upper limit of fuel gas flow. This fuel gas flow rate is set as an upper limit for the command value of fuel gas flow calculated by the PID calculation.

Fuel gas flow rate corresponding with the lower limit value of excess air ratio is calculated from following equation (1)

$$Q_{gas\_limit} = Q_{mix\_act}/(1+\lambda_{st}*\lambda_{lim}) \quad (1),$$

where, $Q_{gas\_limit}$: upper limit of fuel gas flow (l/sec), $Q_{mix\_act}$: actual mixture flow rate (l/sec), $\lambda_{st}$: theoretical air fuel ratio, and $\lambda_{lim}$: excess air ratio obtained from the excess air ratio limit map.

According to the method, fuel gas can be supplied so that air fuel ratio is appropriate, and occurrence of misfire or abnormal combustion can be prevented by performing the limit control like this.

As mentioned above, by performing limit control to the fuel gas flow rate calculated by PID calculation, quantitative limitation of fuel gas supply for various engine operation conditions is made possible and a person who sets limit value can set limit values having physical meaning.

The limit control may be applied at plurality of steps, in such a case the control is accommodated to a limit value of the most small limit range. Or a plurality of steps of limit control may be use properly. There are several methods of setting limit ranges based on other conditions such as a method of setting limit ranges based on the performance of the gas engine 1, a method of setting limit ranges based on power generation efficiency of the generator 40, and a method of setting limit ranges based on exhaust emission.

It is suitable to make a correction to the command value of fuel gas flow obtained by the limit control after PID as necessary.

This correction of fuel gas flow is performed by correcting control variable of the fuel gas flow control valve 16 in the speed control section 51 when time-series variation of input signals relating to performance change of the gas engine 1 exceeds a reference range determined beforehand, and applied mainly when the engine makes transient response such as at load applying load rejection.

The input signals relating to performance change of the gas engine 1 are signals which change with changes of the performance, and an engine rotation speed signal, load signal, mixture inlet pressure signal, generator, and abnormal/shutoff signal of the generator or gas engine can be cited for example as such signals.

As has been described, the speed control section 51 is performs engine speed control by controlling the main chamber fuel gas flow control valve 16 using the command value of fuel gas flow rate obtained by the PID calculation, limit control, and fuel gas flow correction.

Next, mixture flow control in the air fuel ratio control section 52 will be explained.

First engine load factor calculated based on the command value of fuel gas flow calculated in the speed control section 51 and engine speed detected from the following equation (2).

$$LOAD = \frac{Gas}{Gas\_MAX} \times \frac{MAX\_Sp}{Speed} \times 100, \quad (2)$$

where, LOAD: engine load factor (%), Gas: command value of fuel gas flow (l/sec), Gas_MAX: fuel gas flow at maximum output of the engine (l/sec), MAX_Sp: maximum engine rotation speed ($min^{-1}$), Speed: engine rotation speed ($min^{-1}$).

An adequate air fuel ratio is obtained from a map in which adequate air fuel ratios are determined beforehand for a variety of engine load factors and engine rotation speeds using the detected engine speed and the calculated engine load factor, and a command value of mixture flow rate is calculated from the following equation (3) so that excess air ratio of the mixture coincides with the obtained excess air ratio with fuel gas flowing at the commanded fuel flow rate calculated in the speed control section 51.

$$Q_{mix\_ref} = Q_{gas\_ref}(1+\lambda \cdot \lambda_{st}) \quad (3),$$

where, $Q_{mix\_ref}$: command value of mixture flow rate (1/sec), $Q_{gasref}$: command value of fuel gas flow rate (1/sec), $\lambda$: excess air ratio obtained from the adequate excess air ratio map, and $\lambda_{st}$: theoretical air fuel ratio.

As an adequate excess air ratio map, a map shown, for example, in FIG. 9 can be used in which adequate excess air ratios are determined beforehand for a variety of engine load factors and engine rotation speeds. As air fuel ratio and excess air ratio is convertible to each other, excess air ratio in the map may be expressed in air fuel ratio. In using the adequate excess fuel ratio map, the fuel gas flow limit map, and the excess air ratio limit map, when a value of input signal is between values of the parameters in the map, a value correspond to the value of input signal will be obtained by interpolation.

On the other hand, actual mixture flow rate is calculated based on the detected value of engine speed signal, mixture inlet pressure (MAP signal), and inlet mixture temperature (MAT signal). Required mixture flow rate is calculated by the following equation (4).

$$Q_{mix} = \frac{Speed \times V \times Ve \times MAP \times Tn}{2 \times 60 \times Pn \times MAT} \quad (4)$$

where, $Q_{mix}$: actual mixture flow (1/sec), Speed: engine rotation speed (min$^{-1}$), V: total piston swept volume (1), $V_e$: volumetric efficiency, MAP: inlet manifold pressure (kPa), MAT: inlet manifold temperature (K), $T_n$: absolute temperature of 0° C. (273.2K), and $P_n$: absolute pressure of 1 atmospheric pressure (101.31 kPa).

Feedback control is performed to determine a target opening of the throttle valve 18 by PID calculation based on deviation of the actual mixture flow rate from the command value of mixture flow rate, and mixture flow rate is controlled.

[Starting Operation Mode A]

Figure 3:
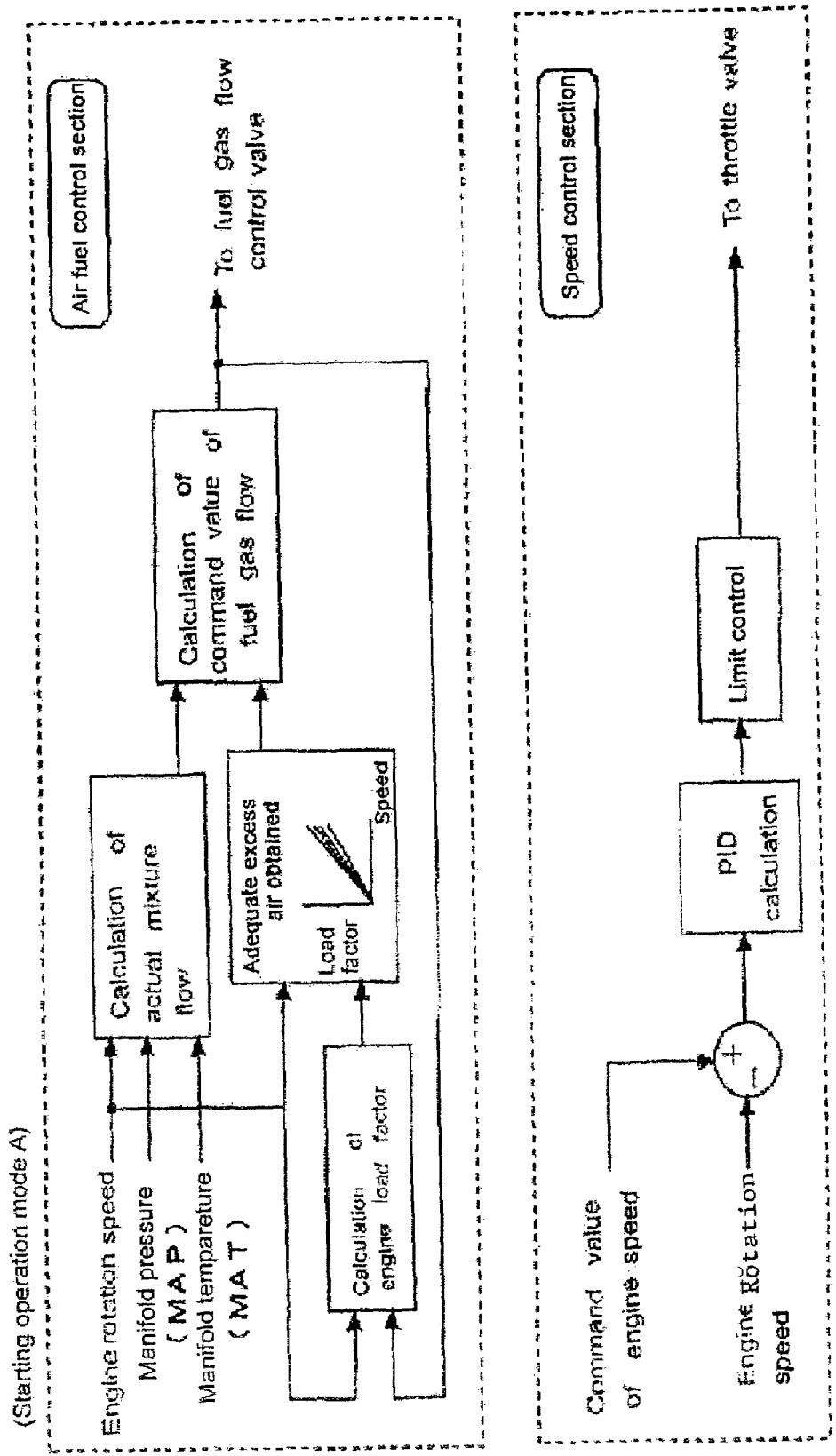
FIG. 3 is a control block diagram of operation mode A which is a starting operation mode.

Control flow in the starting operation mode A will be explained concretely referring to FIG. 3.

First, fuel gas flow control in the air fuel control section 52 will be explained.

Actual mixture flow rate is calculated based on detected engine rotation speed, inlet manifold pressure, and inlet manifold temperature. The actual mixture flow rate can be calculated similarly as in ordinary operation condition from equation 4.

Engine load factor (LOAD) is calculated based on the preceding command value of fuel gas flow and detected engine rotation speed. The engine load factor can be calculated similarly as in the ordinary operation condition from equation 2.

Then, an excess air ratio (or air fuel ratio) is obtained from a map (see FIG. 9) in which adequate excess air ratios (or adequate air fuel ratios) are predetermined for various engine speeds and load factors using the detected engine speed and the calculated load factor.

An optimal fuel gas flow rate is calculated based on the calculated actual mixture flow rate and the excess air ration obtained from the adequate excess air ratio map using the following equation 5.

$$Q_{gas} = \frac{Qmix}{1+\lambda \cdot \lambda st}, \quad (5)$$

where, $Q_{gas}$: command value of fuel gas flow rate (1/sec), $Q_{mix}$: command value of actual mixture flow rate (1/sec), $\lambda$: excess air ratio obtained from the adequate excess air ratio limit map, and $\lambda_{st}$: theoretical air fuel ratio.

Next, mixture flow control in the speed control section will be explained.

Feedback control is performed to determine the target opening of the throttle valve 18 by PID calculation based on deviation of the actual engine speed detected by the engine speed sensor 32 from a target engine speed, and flow rate of mixture supplied to the combustion chamber 7 is controlled by controlling opening of the throttle valve 18. In this way, engine speed control is performed by controlling mixture flow based on engine speed.

Limit control is performed to the target opening of the throttle valve as necessary. The limit control is to set an upper limit of throttle valve opening in accordance with engine speed.

[Capacity Correction]

Figure 4:
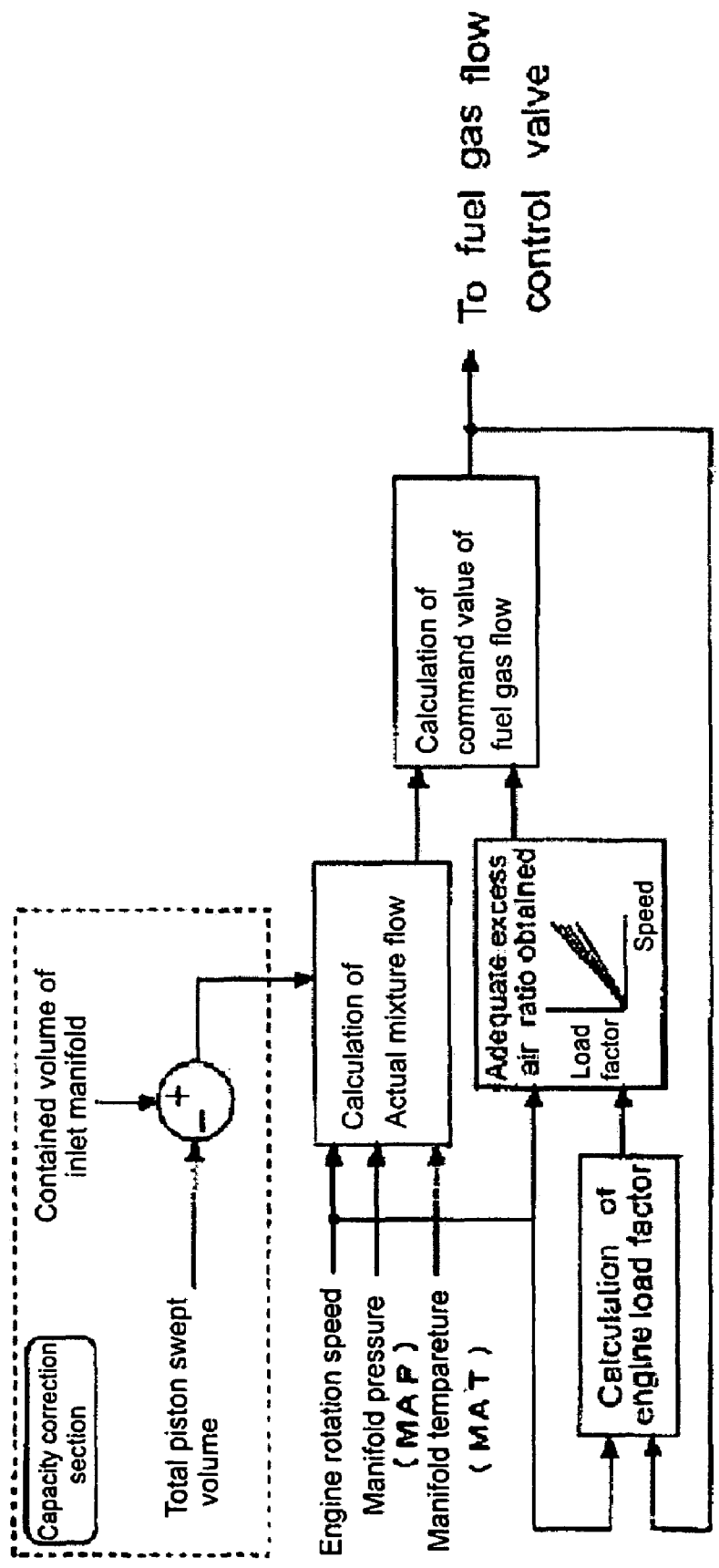
FIG. 4 is a control block diagram of capacity correction procedure.
Figure 5:
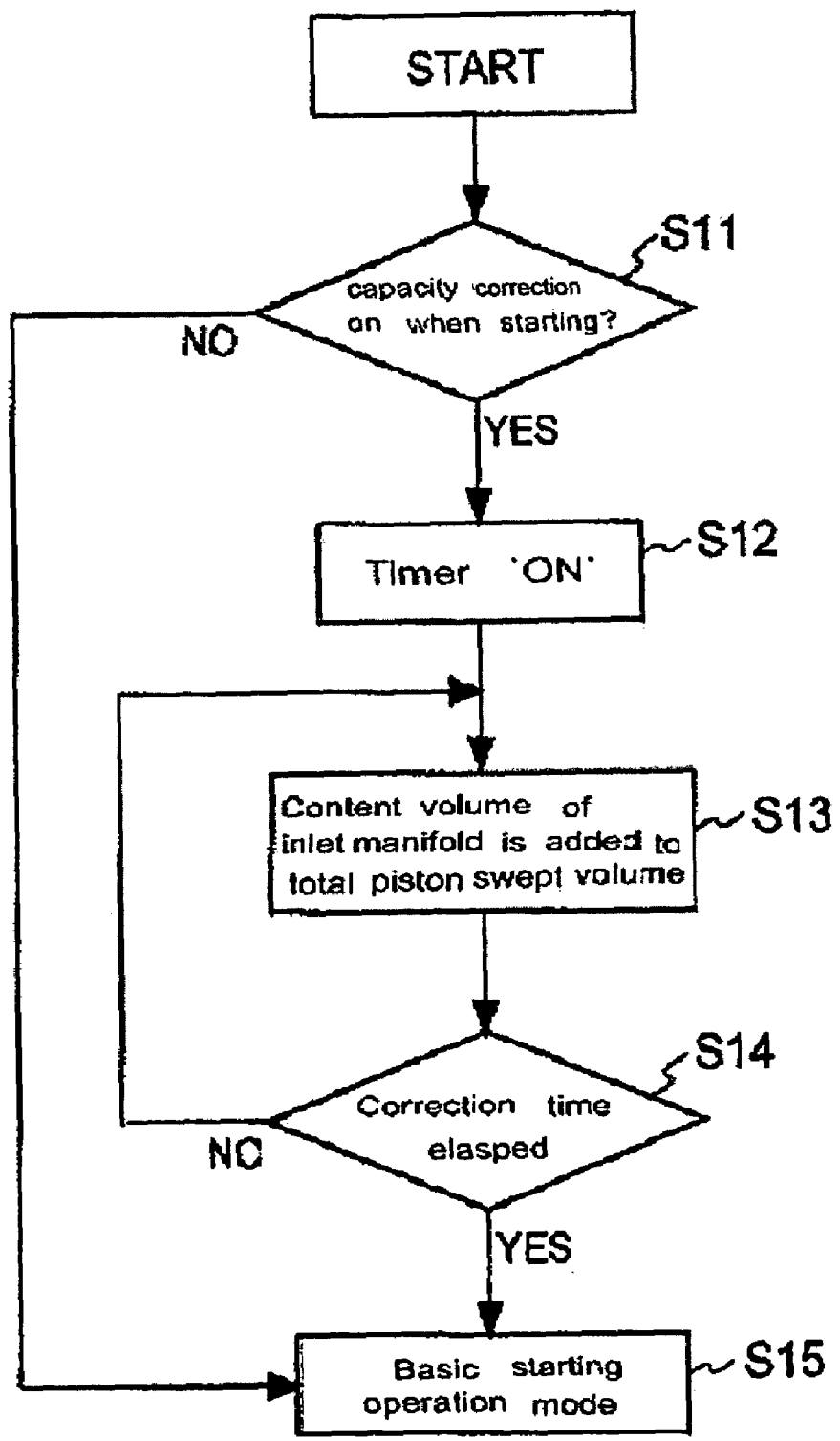
FIG. 5 is a flowchart of capacity correction procedure.

Capacity correction will be explained referring to FIGS. 4 and 5. FIG. 4 is a control block diagram of capacity correction procedure, and FIG. 5 is a flowchart of capacity correction procedure.

When starting a gas engine, fuel gas is not present in the main fuel gas supply pipe 14 and in the mixture supply pipe 20 (inlet manifold) between the fuel gas flow control valve 16 and combustion chamber 7, so some time is needed for fuel gas to reach the combustion chamber 7 at the initial stage of starting operation. According to the embodiment, time needed for starting the engine can be reduced by performing capacity correction processing in which the content volume of the inlet manifold is added to the total piston swept volume when calculating mixture flow rate at the initial stage of the starting operation as shown in FIG. 4, since fuel gas flow is increased by an amount for the content volume of the inlet manifold by this correction.

This capacity correction is preferably performed according to circumstances. As shown in FIG. 5, it is selected whether to switch on the capacity correction or not at step S11. When selected not to switch on, the engine is controlled by the basic starting operation mode (S15). When selected to switch on, first a timer is switched on (S12), and content volume of the inlet manifold is added to the total piston swept volume (S13). Then, when a correction time period prescribed in the timer has elapsed (S14), the correction processing is finished and the flow advances to the basic starting operation mode (S15). It is suitable to prescribe an engine rotation speed at which to finish the correction proceeding instead of the prescribed time period to finish the correction proceeding and the correction proceeding is finished when engine rotation speed reaches the prescribed speed.

As has been described in the foregoing, according to the invention, optimum control in accordance with operation condition is possible by making it possible to switch between the starting operation mode A and normal operation mode B. More specifically, in the normal operation mode B, responsivity to load variation is improved, particularly responsivity in transient operation such as application of load or rejection of load is improved and stable control is possible with air fuel ratio maintained in appropriate range, on the other hand, in starting operation mode A, an optimum command value of fuel gas flow rate is calculated from the actual mixture flow and adequate excess air ratio obtained based on engine rotation speed and load factor and fuel gas flow is controlled by the fuel gas flow control valve based on the command value of fuel gas flow, so mixture of appropriate excess air ratio can be supplied to the combustion chamber when starting the engine, as a result the mixture is easily ignited and engine starting performance can be improved.

Besides, time needed for starting the engine can be reduced by performing capacity correction to add content volume of the inlet manifold to the total piston swept volume when calculating mixture flow rate at the initial stage of the starting operation.

Moreover, by composing the device such that the speed control section 51 and air fuel ratio control section 52 are unified in the electronic control unit 50 so that coordinated control of the engine is performed under cooperation of the speed control section 51 and air fuel ratio control section 52, smooth and accurate control of engine operation is made possible without requiring a plurality of expensive control devices. In addition, an expensive exhaust gas sensor is not needed to provide, so significant cost reduction is made possible.

The integrative control method and device of the invention with which load responsivity is improved with accurate air fuel ratio control maintained can be applied widely to gas engines such as engines for driving generators in normal and emergency service, engines for construction equipment, engines for ships, and engines for railroad vehicles.

The invention claimed is:

1. A method of controlling starting of a gas engine in which fuel gas is introduced via a fuel gas flow control valve to a charging air supply pipe to be mixed with air and the mixture is controlled in its flow rate by a throttle valve and supplied to combustion chambers of the engine, the method comprising:
   a starting operation mode in which fuel gas flow is controlled by the fuel gas flow control valve based on actual mixture flow rate and adequate excess air ratio prescribed for each of detected values of operating conditions of the engine and then mixture flow is controlled by the throttle valve so that engine rotation speed approaches a target rotation speed; and
   a normal operation mode in which fuel gas flow is controlled by the fuel gas flow control valve so that engine rotation speed approaches the target rotation speed and then mixture flow rate is controlled by the throttle valve so that air fuel ratio of the mixture coincides with an adequate value prescribed for each of detected values of operating conditions of the gas engine with the fuel gas flow flowing at a commanded fuel gas flow rate,
   wherein a switchover rotation speed is a predetermined threshold value of engine rotation speed for the engine to be able to run self-reliably, and
   wherein the engine is controlled in the starting operation mode during engine rotation speed from a prescribed initial rotation speed to a prescribed switchover rotation speed, and when the rotation speed rises to equal to or exceeds the prescribed switchover rotation speed, the control is switched to the normal operation mode.

2. A method of controlling starting of a gas engine according to claim 1, wherein the normal operation mode comprises,
   a speed control process for controlling engine rotation speed by calculating a command value of fuel gas flow rate based on deviation of a detected engine rotation speed from a target command value of engine rotation speed and controlling fuel gas flow rate flowing through the fuel gas flow control valve to coincide with the calculated command value of fuel gas flow rate, and
   an air fuel ratio control process for controlling air fuel ratio of fuel-air mixture supplied to the combustion chamber of the engine through performing feedback control in which such a command value of fuel-air mixture flow rate is calculated that air fuel ratio of the mixture coincides with an adequate value prescribed for each of detected values of operating conditions of the gas engine with the fuel gas flow flowing at the commanded fuel gas flow rate and a target opening of the throttle valve is determined based on deviation of the actual mixture flow rate calculated based on detected values of operating conditions of the gas engine from the calculated command value of fuel-air mixture flow rate.

3. A method of controlling starting of a gas engine according to claim 1, wherein a capacity correction is performed when calculating mixture flow rate as actual mixture flow rate at the initial stage of starting operation, the capacity correction being such that content volume of an intake manifold of the engine is added to the total piston swept volume of the engine.

4. A method of controlling starting of a gas engine according to claim 3 wherein the capacity correction processing is finished when a prescribed time period of correction continuation has elapsed or engine rotation speed has reached a prescribed rotation speed.

5. A method of controlling starting of a gas engine according to claim 2,
   wherein capacity correction is performed when calculating mixture flow rate as actual mixture flow rate at the initial stage of starting operation, the capacity correction being such that content volume of an intake manifold of the engine is added to the total piston swept volume of the engine.

6. A starting control device for controlling starting of a gas engine in which fuel gas is introduced via a fuel gas flow control valve to a charging air supply pipe to be mixed with air and the mixture is controlled in its flow rate by a throttle valve and supplied to combustion chambers of the engine, the engine being equipped with a rotation speed sensor for detecting engine rotation speed, an inlet pressure sensor for detecting mixture inlet pressure, an inlet temperature sensor for detecting mixture inlet temperature, and an engine control device for controlling engine operation in accordance with detected values of operating conditions of the engine, the engine control device, comprising:
   a unit that allows the fuel gas flow control valve to control fuel gas flow rate based on actual mixture flow rate detected engine rotation speed, inlet manifold pressure, and inlet manifold temperature and based on an adequate value of excess air ratio prescribed for each of detected values of operating conditions of the gas engine and that allows the throttle valve to control mixture flow rate so that engine rotation speed approaches a prescribed target rotation speed, thereby enabling the control device to perform engine operation in a starting operation mode, and
   the unit that allows the fuel gas flow control valve to control fuel gas flow rate so that engine rotation speed approaches a prescribed target rotation speed and that allows the throttle valve to control mixture flow rate so that excess air ratio of the mixture coincides with an adequate value prescribed for each of detected values of operating conditions of the gas engine with the fuel gas flow flowing at the controlled fuel gas flow rate, thereby enabling the control device to perform engine operation in a normal operation mode; and a switching unit that switches over operation mode from one mode to the other mode at a switchover rotation speed which is a predetermined threshold value of engine rotation speed at which the engine can run seif-reliable, whereby the engine is controlled in the starting operation mode during engine rotation speed from a prescribed initial rotation speed to the switchover rotation speed, and when the rotation speed rises to equal to or exceeds the switchover rotation speed, the control is switched to the normal operation mode.

7. A starting control device for controlling starting of a gas engine according to claim 6, wherein the engine control device comprises, a speed control section for controlling engine rotation speed by calculating a command value of fuel gas flow rate based on deviation of a detected engine rotation speed from a target command value of engine rotation speed and controlling fuel gas flow rate flowing through the fuel gas flow control valve to coincide with the calculated command value of fuel gas flow rate, and an air fuel ratio control section for controlling air fuel ratio of fuel-air mixture supplied to the combustion chamber of the engine through performing feedback control in which such a command value of fuel-air mixture flow rate is calculated that air fuel ratio of the mixture coincides with an adequate value prescribed for each of detected values of operating conditions of the gas engine with the fuel gas flow flowing at a commanded fuel gas flow rate and a target opening of the throttle valve is determined based on deviation of the actual mixture flow rate calculated based on detected values of operating conditions of the gas engine from the calculated command value of fuel-air mixture flow rate.

8. A starting control device for controlling starting of a gas engine according to claim 6, further comprising:

a capacity correction unit that performs such a capacity correction that content volume of an intake manifold of the engine is added to the total piston swept volume of the engine when calculating mixture flow rate as actual mixture flow rate at the initial stage of starting operation, whereby the capacity correction processing is finished when a prescribed time period of correction continuation has elapsed or engine rotation speed has reached a prescribed rotation speed.

9. A starting control device for controlling starting of a gas engine according to claim 7, further comprising:

a capacity correction unit that performs such a capacity correction that content volume of an intake manifold of the engine is added to the total piston swept volume of the engine when calculating mixture flow rate as actual mixture flow rate at the initial stage of starting operation, whereby the capacity correction processing is finished when a prescribed time period of correction continuation has elapsed or engine rotation speed has reached a prescribed rotation speed.

* * * * *